Sept. 9, 1930.  H. SANBORN  1,775,142
ASPARAGUS HARVESTER
Filed Aug. 1, 1928
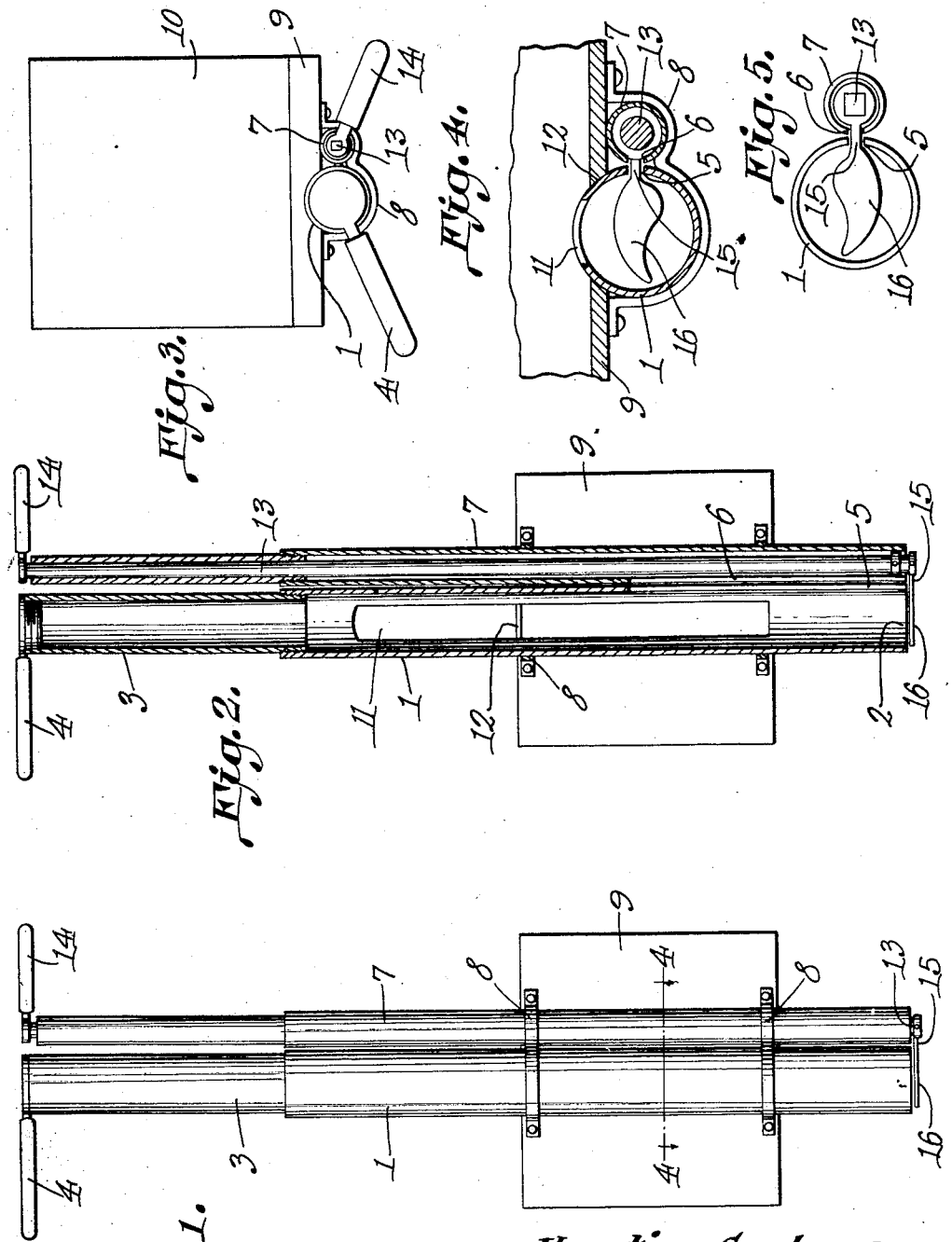
Horatio Sanborn
Inventor
By C. A. Snow & Co.
Attorneys Patented Sept. 9, 1930

1,775,142

UNITED STATES PATENT OFFICE

HORATIO SANBORN, OF BEND, OREGON

ASPARAGUS HARVESTER

Application filed August 1, 1928. Serial No. 296,736.

This invention relates to a device for harvesting asparagus, one of the objects being to provide a simple and efficient means for cutting off the tops of asparagus and directing them into a container provided for that purpose.

With the foregoing and other objects in view which will appear as the description proceeds, the invention resides in the combination and arrangement of parts and in the details of construction hereinafter described and claimed, it being understood that changes in the precise embodiment of the invention herein disclosed may be made without departing from the spirit of the invention.

In the accompanying drawings, the preferred form of the invention has been shown.

In said drawings,

Figure 1 is an elevation of the asparagus harvesting device constituting the present invention.

Figure 2 is a longitudinal section therethrough.

Figure 3 is a top plan view.

Figure 4 is an enlarged section on line 4—4, Figure 1.

Figure 5 is a bottom view of the knife and adjacent parts.

Referring to the figures by characters of reference 1 designates an elongated tubular guide open at one end, as shown at 2 while its other end has an extension 3 to which is fixedly attached a handle 4 extending radially therefrom. The guide 1 is provided with a longitudinal guide slot 5 extending thereinto from the lower open end of the guide and this slot registers with a similar slot 6 formed in the wall of a tubular housing 7. The tubular guide 1 and the housing 7 may be held fixedly together by any suitable means such as bands 8 embracing the same and secured to the cover 9 of a box 10. This box can be removably connected to the cover in any manner desired. An outlet slot 11 is formed in the guide member 1 and extends longitudinally thereof, there being a corresponding slot 12 in the box cover 9 which communicates with the lower portion of the slot 11. This slot 12 is extended throughout the height of the cover 9 as shown particularly in Figure 2.

Slidable within the housing 7 is a rod 13 to one end of which is connected a radial handle 14. The other end of the rod has a stem 15 radiating therefrom and this stem is connected to a cutting blade 16 the length of which is slightly less than the diameter of the guide tube 1.

Under normal conditions the blade 16 is located beyond the open end 2 of the guide tube 1 so that it is thus possible to rotate the rod 13 by means of handle 14 and swing the blade 16 away from under the end of the guide rod 1.

The apparatus is adapted to be carried by means of the two handles 4 and 14. When it is desired to cut off and gather the top portion of an asparagus sprout, the guide member 1 is moved downwardly on the sprout and thereafter handle 14 is swung out of normal position so as to cause the blade 16 to swing across the open end 2 of the guide tube, thereby severing the asparagus tip. The blade is then adjusted so that the stem 15 will be disposed at one end of the slots 5 and 6 whereupon, by pulling on the handle 14, the stem 15 will be caused to slide longitudinally of the slot and the blade 16, which supports the asparagus tip, will convey the same to the slot 11. The tip can be caused to gravitate through the slot 11 and the slot 12 into the box 10. By repeating the operation the box can be filled with the tips after which it can be detached from the cover and another box substituted.

What is claimed is:

1. A device for harvesting asparagus including a container, a guide tube having a longitudinal outlet slot opening into the container, a rod slidably and rotatably mounted adjacent the guide tube, a handle connected to the guide tube, another handle connected to the rod, and an asparagus severing and conveying blade connected to one end of the rod and normally supported across one end of the guide tube, there being a longitudinal slot in the tube to permit the movement of the blade longitudinally of the guide tube for elevating a severed asparagus tip to the outlet slot.

2. A device for harvesting asparagus including a container having a slot, a guide tube having a longitudinal outlet slot opening into the container and a longitudinal guide slot, a housing fixed relative to the guide tube and having a slot registering with the guide slot, a rod slidably and rotatably mounted in the housing, a handle connected to the guide tube, another handle connected to the rod, and an asparagus severing and conveying blade connected to one end of the rod and normally supported across one end of the guide tube, said blade being shiftable longitudinally of the guide tube and the registering slots for elevating a severed asparagus tip to the outlet slot.

3. Apparatus for harvesting asparagus including a container, a guide tube having an outlet slot opening into the container, said tube being open at its lower end, a handle at the other end of the tube, a tubular housing fixedly connected to the guide tube, a rod slidably and rotatably mounted within the housing, a handle at one end of the rod, and a combined severing blade and conveyor at the other end of the rod, there being registering longitudinal slots in the housing and guide tube, thereby to permit movement of the blade longitudinally of the guide tube to elevate a severed asparagus tip to the outlet slot.

4. A device for harvesting asparagus including a guide tube having a longitudinal outlet slot, a rod slidably and rotatably mounted adjacent the guide tube, a handle connected to the guide tube, another handle connected to the rod, and an asparagus severing and conveying blade connected to the rod and normally supported across one end of the guide tube, there being a longitudinal slot in the tube to permit movement of the blade longitudinally of the guide tube for elevating the severed asparagus tip to the outlet slot.

In testimony that I claim the foregoing as my own, I have hereto affixed my signature.

HORATIO SANBORN.